(No Model.)
J. MILBURN.
HAIR PIN.
No. 580,581. Patented Apr. 13, 1897.
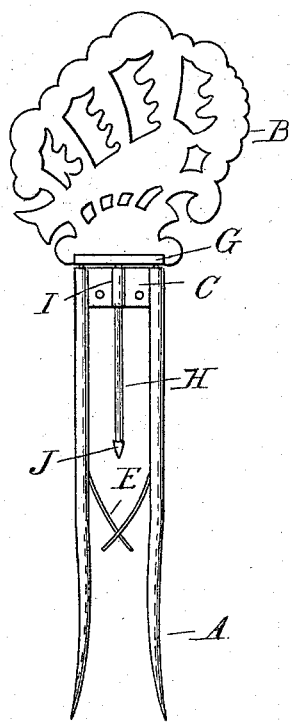
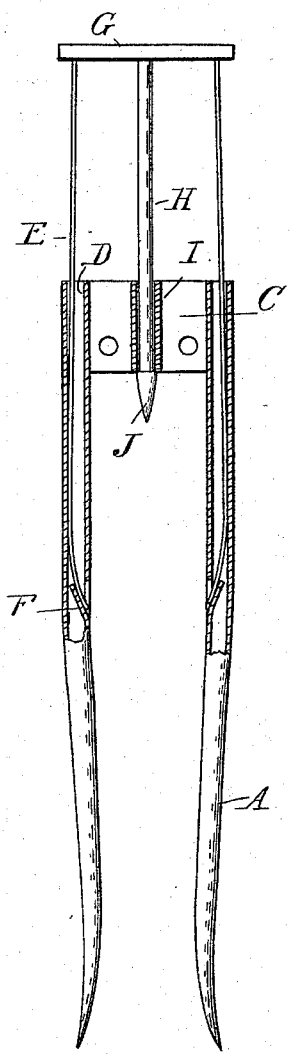
Witnesses
Otto F. Barthel
M. E. Dogherty
Inventor
Joseph Milburn
By his Att'ys

UNITED STATES PATENT OFFICE.

JOSEPH MILBURN, OF DETROIT, MICHIGAN.

HAIR-PIN.

SPECIFICATION forming part of Letters Patent No. 580,581, dated April 13, 1897.

Application filed June 6, 1896. Serial No. 594,479. (No model.)

*To all whom it may concern:*

Be it known that I, JOSEPH MILBURN, a citizen of the United States, residing at Detroit, in the county of Wayne and State of Michigan, have invented certain new and useful Improvements in Hair-Pins, of which the following is a specification, reference being had therein to the accompanying drawings.

My invention relates to a safety hair-pin— that is, one that is provided with means for locking it under a portion of the hair to prevent accidental disengagement.

The invention consists in the construction, arrangement, and combination of the various parts, all as more fully hereinafter described.

In the drawings, Figure 1 is a rear elevation, and Fig. 2 is a longitudinal section.

A are two tines of a forked or double-tined hair-pin. This may be of the usual hair-pin shape, or, in case a fancy-head B is used, may be as shown in the drawings, in which the two tines are connected at the top laterally by the plate C, which in turn is connected to the head. The upper parts of the tines are hollow or have a bearing D to receive the prongs E. At the lower end of this hollow portion (or at the lower part of the bearing D) is the inclined guide F, against which the end portion of the prong engages. The prongs being connected together, preferably by a head G, if they are pressed down the inclined guides will force their inner ends inward to cross each other between the tines, as shown in Fig. 2. In their upper or withdrawn position these prongs are entirely within the tines or hidden, so that they will in no way interfere with the free and uninterrupted insertion of the hair-pin into the hair. To prevent the binding of these prongs or the movement of one side in advance of the other in pushing the prongs out, I preferably provide the guide-pin H, secured to the head G and engaging through a vertical guide-bearing I on the plate C. This pin preferably has a stop or shoulder J to prevent the withdrawal of the prongs from their bearings.

I am aware that numerous changes can be made without departing from the nature and principle of my invention.

What I claim as my invention is—

1. In a hair-pin, the combination with tines having each a hollow upper portion and an aperture in the side wall of said hollow portion, of inclined bearings in each tine adjacent said apertures, and flexible prongs sliding in the hollow tines and deflected by said inclined bearings through said apertures to cross each other between the tines, substantially as described.

2. In a hair-pin, the combination with the tines having straight longitudinal bearings, of prongs slidingly engaging in said bearings, bearings situated near the lower end of said first-mentioned bearings, inclined relative to the tines and adapted to cause said prongs to intersect or cross each other between the tines in their lowered position, substantially as described.

3. In a hair-pin, the combination with the tines having hollow upper portions, flexible prongs sliding through the tines, lateral apertures on the inner face of the tines through which the ends of the prongs project, a head connecting the prongs, and a guide for the moving prongs, substantially as described.

4. In a hair-pin, the combination of two tubular tines, portions of the inner faces or walls of which are bent inward to form inclined guides F and apertures, and prongs slidingly engaging in said tubular tines and adapted to be projected through said apertures and toward each other by said guides, substantially as described.

In testimony whereof I affix my signature in presence of two witnesses.

JOSEPH MILBURN.

Witnesses:
JAS. WHITTEMORE,
OTTO F. BARTHEL.